United States Patent
Heikal et al.

(10) Patent No.: US 12,437,458 B2
(45) Date of Patent: Oct. 7, 2025

(54) DYNAMIC TRANSITION FROM VIDEO TO PERSONALIZED PHOTOREALISTIC FACIAL REPRESENTATIONS IN DIGITAL COMMUNICATIONS

(71) Applicant: Charter Communications Operating, LLC, St. Louis, MO (US)

(72) Inventors: Hany A. Heikal, Aurora, CO (US); Christopher Glen Turner, Aurora, CO (US); Dell Lawrence Wolfensparger, Seaview, WA (US)

(73) Assignee: Charter Communications Operating, LLC, St. Louis, MO (US)

( * ) Notice: Subject to any disclaimer, the term of this patent is extended or adjusted under 35 U.S.C. 154(b) by 80 days.

(21) Appl. No.: 18/487,649

(22) Filed: Oct. 16, 2023

(65) Prior Publication Data

US 2025/0124632 A1 Apr. 17, 2025

(51) Int. Cl.

| | |
|---|---|
| *G06T 13/40* | (2011.01) |
| *G06T 7/20* | (2017.01) |
| *G06T 17/20* | (2006.01) |
| *G06V 10/54* | (2022.01) |
| *G06V 40/16* | (2022.01) |
| *H04N 7/15* | (2006.01) |

(52) U.S. Cl.
CPC ............... *G06T 13/40* (2013.01); *G06T 7/20* (2013.01); *G06T 17/20* (2013.01); *G06V 10/54* (2022.01); *G06V 40/176* (2022.01); *H04N 7/15* (2013.01); *G06T 2207/30201* (2013.01)

(58) Field of Classification Search
CPC .......... G06T 13/40; G06T 7/20; G06T 17/20; G06T 2207/30201; G06V 10/54; G06V 40/176; H04N 7/15
See application file for complete search history.

(56) References Cited

U.S. PATENT DOCUMENTS

| | | | |
|---|---|---|---|
| 10,872,457 B1* | 12/2020 | Hu ........................... G06T 7/40 |
| 2011/0115786 A1* | 5/2011 | Mochizuki ............ G06T 11/001 |
| | | | 345/419 |
| 2012/0092475 A1* | 4/2012 | Li ........................ A63F 13/655 |
| | | | 348/E7.085 |
| 2012/0280974 A1* | 11/2012 | Wang ...................... G10L 21/10 |
| | | | 345/419 |
| 2016/0134840 A1* | 5/2016 | McCulloch .......... G06V 40/165 |
| | | | 348/14.03 |
| 2023/0334674 A1* | 10/2023 | Shin ..................... G06V 40/166 |

* cited by examiner

*Primary Examiner* — Maurice L. McDowell, Jr.
(74) *Attorney, Agent, or Firm* — Dority & Manning, P.A.

(57) ABSTRACT

Video data that depicts a facial motion of a face of a particular user of a computing device is obtained. A determination is made that a network performance metric for a network connection is less than a threshold network performance metric. Responsive to the determination, motion capture information is determined based on the video data. The motion capture information is indicative of the facial motion of the face of the particular user. The motion capture information is transmitted to the computing system. The motion capture information is for animation of a photorealistic three-dimensional representation of the face of the particular user.

23 Claims, 7 Drawing Sheets

DYNAMIC TRANSITION FROM VIDEO TO PERSONALIZED PHOTOREALISTIC FACIAL REPRESENTATIONS IN DIGITAL COMMUNICATIONS

BACKGROUND

Video-based communication has become an increasingly popular method of communication in recent years. For example, videoconferencing is widely used to conduct business transactions, legal proceedings, educational seminars, etc. In addition, video data has recently been utilized to power visual communications within virtual worlds. For example, by leveraging machine learning technologies, video data can be utilized to generate, and animate, virtual avatars to represent users in a personalized manner within a virtual world

SUMMARY

A computing system can obtain video data depicting a facial motion of a user. The computing system can evaluate current network performance. Based on a network performance metric being less than a threshold, the computing system can generate motion capture information and provide the information to a computing system. The computing system can animate and broadcast a photorealistic representation of the user's face as an alternative to the video stream of the user.

In one implementation, a method is provided. The method includes obtaining, by a computing device comprising one or more processor devices, video data that depicts a facial motion of a face of a particular user of the computing device. The method includes making, by the computing device, a determination that a network performance metric for a network connection of the computing device is less than a threshold network performance metric. The method includes, responsive to the determination, determining, by the computing device, motion capture information based on the video data, wherein the motion capture information is indicative of the facial motion of the face of the particular user. The method includes transmitting, by the computing device, the motion capture information to the computing system, wherein the motion capture information is for animation of a photorealistic three-dimensional representation of the face of the particular user.

In another implementation, a computing system is provided. The computing system includes a memory and one or more processor devices coupled to the memory. The processor device(s) are configured to receive, from a computing device, video data that depicts the face of a particular user associated with the computing device. The processor device(s) are configured to determine that the computing device has ceased transmission of video data responsive to a network performance metric associated with a network connection of the computing device. The processor device(s) are configured to receive, from the computing device, motion capture information indicative of a facial motion of the face of the particular user of the computing device, wherein the motion capture information is derived by the computing device from video data that depicts the facial motion of the face of the particular user. The processor device(s) are configured to generate second video data that depicts a photorealistic three-dimensional representation of the face of the particular user, wherein the photorealistic three-dimensional representation of the face of the particular user is animated to perform the facial motion based on the motion capture information.

In another implementation, a non-transitory computer-readable storage medium that includes executable instructions is provided. The instructions are configured to cause one or more processor devices of a computing device to obtain video data that depicts a facial motion of a face of a particular user of the computing device. The instructions are configured to cause the one or more processor devices of the computing device to make a determination that a network performance metric for the network connection is less than a threshold network performance metric. The instructions are configured to cause the one or more processor devices of the computing device to, responsive to the determination, determine motion capture information based on the video data, wherein the motion capture information is indicative of the facial motion of the face of the particular user. The instructions are configured to cause the one or more processor devices of the computing device to transmit the motion capture information to the computing system, wherein the motion capture information is for animation of a photorealistic three-dimensional representation of the face of the particular user.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
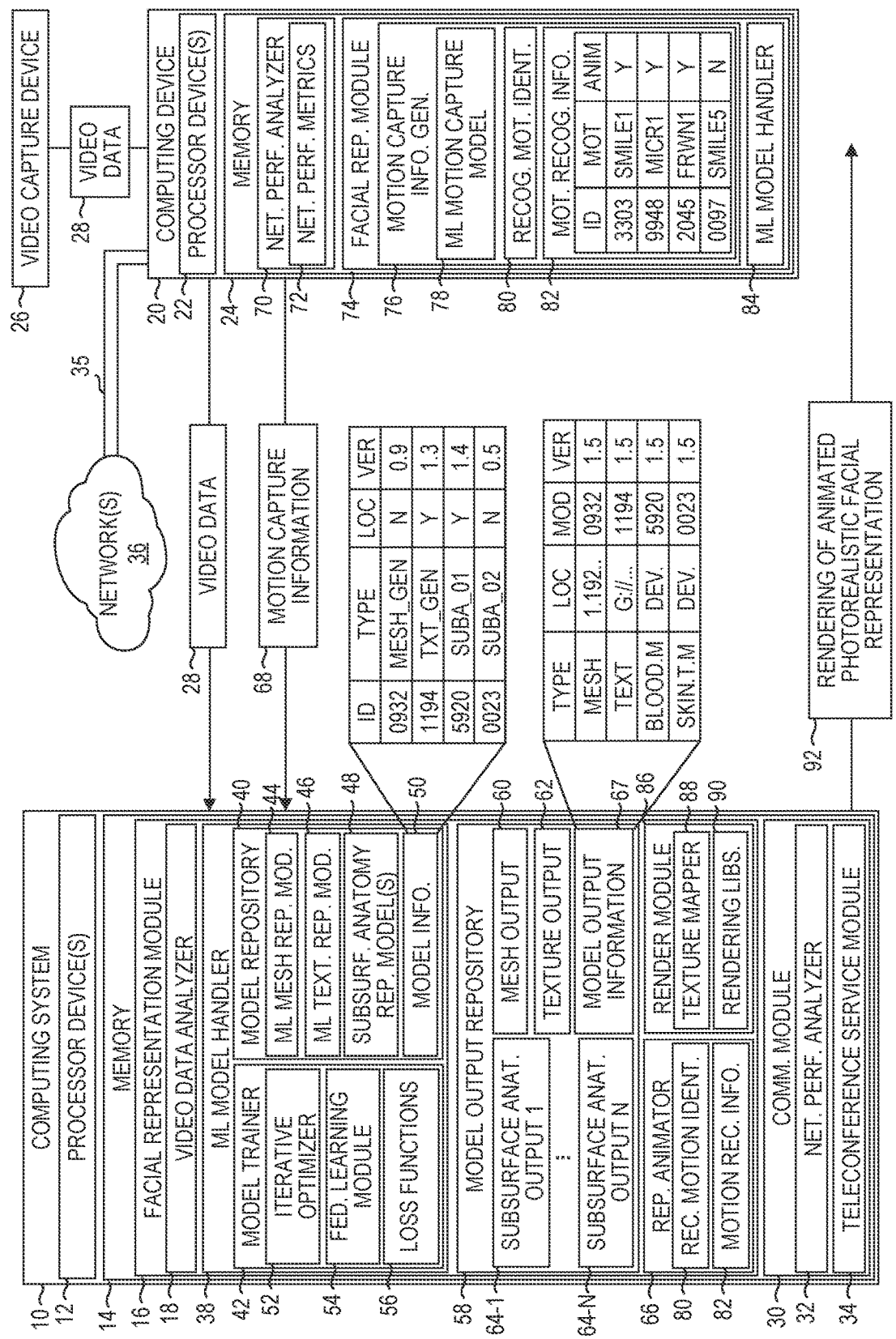
FIG. 1 is a block diagram of an environment suitable for implementing personalized photorealistic 3D facial representations according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flow charts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

As mentioned previously, video-based communication has become an increasingly popular method of communication in recent years. Videoconferencing is widely used to conduct business transactions, legal proceedings, educational seminars, etc. In addition, video data can be utilized to power visual communications within virtual worlds. For example, by leveraging machine learning technologies, video data can be utilized to generate, and animate, virtual avatars to represent users in a personalized manner within a virtual world.

A major drawback to utilizing video-based communication technologies is the bandwidth necessary to enable such communications. Unlike audio-based communications, which only requires the transfer of audio data, video-based communications require the user to transmit hundreds of frames (e.g., images) every minute, which oftentimes possess high visual fidelity (e.g., resolution, lossless compression, etc.). As such, without a sufficiently strong network connection (e.g., a Fifth Generation (5G) New Radio (NR) connection, etc.), a user cannot reliably participate in video-based communications.

In addition, any fluctuations in the signal strength of a network connection can cause a user's video stream to temporarily cease transmission due to insufficient bandwidth. For example, assume that a smartphone device is connected to a high-speed network (e.g., 5G NR) and is being used to transmit a video stream to a videoconference session. If the network connection suffers any loss of signal strength (e.g., from traveling through a tunnel, switching to a different network node, leaving the area of service for a current network node, etc.), the video stream transmitted by the user can suffer severe loss of quality (e.g., stuttering, reduced resolution, packet loss, etc.) or can stop entirely.

However, substantial fluctuations in signal strength are relatively common in wireless networks, and even in wired networks, drops in service are to be expected. As such, many videoconference sessions include users that broadcast video streams with poor quality, which in turn can substantially degrade the videoconferencing experience for all users. Further, users with Internet Service Providers (ISPs) that charge additional fees for high bandwidth utilization often wish to avoid videoconferencing when possible. As such, techniques to reduce bandwidth utilization for videoconferencing are greatly desired.

One technique to reduce bandwidth utilization in videoconferencing is the use of virtual environments. More specifically, some attempts have been made to represent users using virtual avatars rendered in a virtual environment (e.g., a "meta" virtual world/universe, etc.). For example, rather than transmitting a video stream, a user can transmit an audio stream while controlling an avatar in a three-dimensional environment. The avatar can be designed to be visually similar to the user, and may be designed to mimic a speaking motion when the user speaks. By representing users with virtual avatars, such techniques can provide visual stimuli to the user in addition to the exchange of audio data, thus preserving some portion of the immersion offered by real-time videoconferencing.

However, there are several drawbacks to such approaches. First, conventional representations are commonly stylized in a "cartoon-like" manner with reduced visual fidelity because the techniques used to create them are generally incapable of creating "life-like," or "photorealistic" representations. In addition, these techniques are commonly incapable of realistically animating such avatars to mimic the facial movements of a user. For example, while a conventional technique may be capable of recognizing that a user is smiling and cause a representation to perform a default animation for smiling, such techniques cannot perform the smile motion in the same manner as the user. Due to these deficiencies, many users prefer to limit communications to the exchange of audio data rather than videoconference using virtualized environments.

Accordingly, implementations of the present disclosure propose user-specific machine-learned model ensembles for photorealistic facial representation. In addition, implementations described herein propose dynamic and seamless substitution of photorealistic facial representations for video streams (and vice-versa) based on fluctuations in network performance. More specifically, assume that a computing system hosts a teleconference session in which multiple computing devices exchange video streams. The computing system (or another computing system in the same network) can obtain video data from one of the computing devices for broadcasting to the other computing devices. The video data can depict the face of the user. For example, the video data may depict the face of the user performing some manner of expression or microexpression that is unique to the user.

The computing system can process the video data with a user-specific model ensemble. The user-specific model ensemble can be a collection of machine-learned models that are each trained to generate a component of a photorealistic facial representation of the user. Specifically, each of the user-specific models can be iteratively optimized to generate an increasingly higher quality component of the photorealistic facial representation of the user. For example, a first user-specific model can be trained to generate a three-dimensional (3D) polygonal mesh representation of the face of the user, or the head of the user. Another model can be trained to generate textures that represent the surface of the face of the user. Yet another model, or models, can be trained to generate representations of various sub-surface anatomies of the user, such as blood flow maps or skin tension maps.

The computing system can train the models based on the model outputs derived from the video data in either a supervised or unsupervised manner. For example, the computing system may train the first user-specific model (e.g., the mesh representation model) based on a loss function that evaluates a difference between the mesh representation and a ground-truth mesh representation (e.g., a mesh representation derived from point cloud data or other highly accurate information). For another example, the computing system may train the first user-specific model in an unsupervised manner or a semi-supervised manner (e.g., by creating a Generative Adversarial Network (GAN), etc.).

Additionally, or alternatively, the computing system can optimize existing model outputs based on the video data. For example, assume that an existing mesh representation of the user's face had been generated previously using the mesh representation model and has been optimized based on video data collected over multiple prior videoconferencing sessions. Further assume that the user typically looks straight into the video capture device, and rarely turns their head. Because most of the video data utilized to train the mesh representation model depicts the front of the user's face, the portions of the existing mesh representation that represent the front of the user's face may be higher fidelity than those portions that represent the side of the user's face. As such, if the video data currently being provided by the user depicts the side of the user's face, the corresponding model output can be utilized to increase the fidelity of the portions of the existing mesh representation that represent the side of the user's face. In this manner, model outputs can be iteratively optimized as users conduct multiple video capture sessions over time.

As described, the computing system can iteratively optimize various components of a photorealistic 3D representation of the face of the user. Once the photorealistic 3D representation of the face of the user is of sufficient visual fidelity, the computing system can utilize the photorealistic 3D representation of the face of the user as a substitute for video data provided by the user. The photorealistic 3D representation can be animated to mimic the expressions and facial movements of the user in real-time so that the other users connected to the videoconferencing session remain immersed.

More specifically, if the computing device of the user determines that the bandwidth of its current network connection is insufficient for video conferencing, the computing device can provide motion capture information to the computing system in lieu of video data. The motion capture information can be derived from the video data by the computing device (e.g., using a machine-learned model, etc.). The motion capture information can precisely indicate the facial motion of the face of user. In turn, the computing system can render the photorealistic 3D representation of the face of the user, and can animate the representation based on the motion capture information. The rendered and animated photorealistic representation of the face of the user can be seamlessly substituted for the video data that depicts the user and can be transmitted to other participants of the videoconference. In this manner, substantial inefficiencies associated with videoconferencing can be eliminated, and network bandwidth utilization can be substantially reduced.

Implementations of the present disclosure provide a number of technical effects and benefits. As one example technical effect and benefit, implementations of the present disclosure can substantially reduce overall network bandwidth utilization. For example, a conventional 4K resolution video stream provided by a user for videoconferencing can, on average, utilize sixteen gigabytes per hour. In turn, this substantial bandwidth utilization can reduce network capabilities for others sharing the same network. However, implementations of the present disclosure enable the generation and animation of photorealistic 3D representations of the faces of users. Unlike conventional videoconferencing, when utilizing the techniques described herein only audio data and motion capture information is necessary for transmission from the user device, which requires substantially less bandwidth than transmission of video data. In such fashion, implementations of the present disclosure substantially reduce bandwidth utilization in wireless networks while retaining the immersion and other benefits provided by conventional videoconferencing.

FIG. 1 is a block diagram of an environment suitable for implementing personalized photorealistic 3D facial representations according to some implementations of the present disclosure. A computing system 10 includes processor device(s) 12 and memory 14. In some implementations, the computing system 10 may be a computing system that includes multiple computing devices. Alternatively, in some implementations, the computing system 10 may be one or more computing devices within a computing environment that includes multiple distributed devices and/or systems. Similarly, the processor device(s) 12 may include any computing or electronic device capable of executing software instructions to implement the functionality described herein.

The memory 14 can be or otherwise include any device(s) capable of storing data, including, but not limited to, volatile memory (random access memory, etc.), non-volatile memory, storage device(s) (e.g., hard drive(s), solid state drive(s), etc.). In particular, the memory 14 can include a containerized unit of software instructions (i.e., a "packaged container"). The containerized unit of software instructions can collectively form a container that has been packaged using any type or manner of containerization technique.

The containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

The memory 14 can include a facial representation module 16. The facial representation module 16 can be, or otherwise include, any manner or collection of hardware (e.g., physical or virtualized) and/or software resources sufficient to implement the various implementations described herein. In particular, the facial representation module 16 can be utilized to generate, optimize, render, etc. a photorealistic 3D representation of a face of a user.

To do so, the facial representation module 16 can include a video data analyzer 18. The video data analyzer 18 can manage video data received from computing devices, such as computing device 20. The video data analyzer 18 can perform preliminary operations to capture certain portions of video data for utilization in training machine-learned models and/or optimizing machine-learned model outputs. In addition, the video data analyzer 18 can perform preliminary operations to determine whether video data received from computing devices is insufficient for particular applications, such as videoconferencing.

The computing device 20 can include processor device(s) 22 and memory 24 as described with regards to the processor device(s) 12 and memory 14 of the computing system 10. The computing device 20 can be any type or manner of device that can obtain video data and transmit video data to the computing system 10 (e.g., a smartphone, laptop, tablet, desktop computing device, wearable computing device, peripheral computing device (e.g., Augmented Reality (AR)/Virtual Reality (VR) device, wireless earbuds device, etc.), etc.). Similarly, the video capture device 26 can be a device included in the computing device 20, or can be a peripheral device communicatively coupled to the computing device 20 (e.g., a webcam, etc.).

The computing device 20 can receive video data 28 from a video capture device 26 associated with the computing device 20. The computing device 20 can transmit the video data 28 to the computing system 10. It should be noted that the video data 28 can include additional communication data or associated data, such as audio data, textual content, etc. For example, the video capture device 26 can include an audio capture device, and the video data 28 can include an audio track that is recorded with the audio capture device at the same time at which the video data 28 is captured.

If the computing system 10 is orchestrating communications between computing devices, the computing system 10 can broadcast the video data 28 to other computing devices. Specifically, the computing system 10 can include a communications module 30. The communications module 30 can include a network performance analyzer 32 and a teleconference service module 34. The network performance analyzer 32 will be discussed in greater detail further in the specification.

The teleconference service module 34 can host, or otherwise orchestrate, teleconference sessions between multiple computing devices (e.g., videoconferences, audioconferences, multimedia conferences, AR/VR conferences, etc.). To do so, the teleconference service module 34 can process communication data, such as the video data 28, and broadcast the communication data to other computing devices. Additionally, or alternatively, in some implementations, the teleconference service module 34 can orchestrate Peer-to-Peer (P2P) teleconference sessions between computing devices.

The computing device 20 can transmit the video data 28 to the computing system 10 via a network connection 35 implemented by the network(s) 36. The network(s) 36 can be one or more wired and/or wireless networks capable of conveying information between the computing system 10 and the computing device 20 (e.g., a 5G NR wireless network, a Fourth Generation (4G) Long-Term Evolution (LTE) network, a high-speed Wi-Fi network, a high-speed residential network such as a fiber-optic or cable network, etc.).

For example, assume that the computing system 10 hosts a videoconference session. The computing device 20 can obtain the video data 28 via the video capture device 26. The computing device 20 can transmit the video data 28 to the computing system 10 via the network connection 35 to the network 36. The computing system can process the video data 28 with the video data analyzer 18. If the video data 28 is sufficient, the computing system 10 can broadcast the video data 28 to other computing devices included in the videoconference session via the teleconference service module 34.

Over time, a particular user can utilize the computing device 20 to participate in multiple videoconferencing sessions orchestrated by the teleconference service module 34. The computing system 10 can utilize the video data 28 transmitted to the computing system 10 during such sessions to generate a photorealistic 3D facial representation of the face of the particular user of the computing device 20 with the facial representation module 16.

The facial representation module 16 can include a machine-learned model handler 38. The machine-learned model handler 38 can obtain, instantiate, train, optimize, and utilize various machine-learned models. To do so, the machine-learned model handler 38 can include a model repository 40 and a model trainer 42. The model repository 40 can store and catalogue information regarding each of the machine-learned models utilized to generate the photorealistic 3D representation of the user's face. The model trainer 42 can be utilized to train the models stored by the model repository 40.

The model repository 40 can store machine-learned models utilized to generate the photorealistic 3D representation of the user's face. The models stored by the model repository 40 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

Some example machine-learned models can leverage an attention mechanism such as self-attention. For example, some example machine-learned models can include multi-headed self-attention models (e.g., transformer models). Additionally, or alternatively, in some other contexts, a model may refer to a portion of a model, or multiple models or portions of models. For example, a Generative Adversarial Network (GAN) can include an encoder model and decoder model during training, while the encoder model may be utilized exclusively during inference. The term "model" may refer to either, or both, of these models depending on the context in which the term is used.

One of the models stored by the model repository 40 can be, or otherwise include, a machine-learned mesh representation model 44. The machine-learned mesh representation model 44 can be trained to generate a mesh representation of the face of the particular user, and/or of the head of the user or a portion of the head of the user. The mesh representation can be a polygonal mesh that represents the user's face in three dimensions.

In some implementations, the machine-learned mesh representation model 44 can be a three-dimensional representation model that represents the face of the user in some manner other than a mesh representation. For example, the machine-learned mesh representation model 44 can be a model trained to generate an implicit three-dimensional representation of the face of the user, such as a Neural Radiance Field (NeRF) or some other manner of neural graphics primitive. A non-mesh representation may either be utilized directly, or converted to a mesh representation (e.g., using machine-learning techniques or conventional techniques).

The fidelity of the mesh representation generated using the machine-learned mesh representation model 44 can vary. In particular, the fidelity of the mesh representation can be optimized iteratively over time as a user provides the video data 28 to the computing system 10. For example, a first mesh representation of the face of the user may include a number of polygons N. After performing a series of optimization iterations in which the machine-learned mesh representation model 44 and/or the mesh representation itself is optimized based on additional video data, a second mesh representation of the face of the user may include a number of polygons M that is substantially higher than N.

The model repository 40 can include a machine-learned texture representation model 46. The machine-learned texture representation model 46 can generate a plurality of textures that represent the surface of the face of the particular user. The textures generated using the machine-learned texture representation model 46 can include graphical textures. Graphical textures can map colors, and/or images, to the polygons of the mesh representation of the user's face. For example, a graphical texture may indicate that a polygon be assigned a particular color. For another example, a graphical texture may be applied directly to multiple polygons such that the texture serves as the "surface" of the polygons.

Additionally, or alternatively, in some implementations, the textures can include, indicate, or map other types of information to the mesh representation of the face of the user. For example, the textures can include albedo texture maps that represent the base color of a material or surface. For another example, the textures can include normal maps that represent surface features without requiring additional polygons (e.g., as a vector that points out from the surface of the polygon). For another example, the textures can include specular maps that define the amount of light that is reflected by a surface of the mesh representation. For yet another example, the textures can include roughness maps that define the appearance of a surface roughness, reflection maps that simulate reflective properties, ambient occlusions that simulate a quantity of ambient light that is blocked by nearby objects, etc.

It should be noted that, in some implementations, the machine-learned texture representation model 46 can include multiple portions or sub-models that are each trained to generate a particular type of texture map. For example, a first portion of the machine-learned texture representation model 46 can be trained to generate graphical textures while another portion of the machine-learned texture representation model 46 can be trained to generate normal maps. Such portions or sub-models can be trained separately or can be trained in an end-to-end fashion.

The model repository 40 can include one or more subsurface anatomy representation models 48. The subsurface anatomy representation models 48 can represent various anatomy(s) of the user's face that reside under the surface of the user's skin. Such anatomies can include bone structure, skin tension, blood flow, musculature, fat distribution, skin sag, distortions (e.g., scarring), implants (e.g., dermal implants), etc. Each of the subsurface anatomy representation models 48 can be utilized to generate a representation of a different sub-surface anatomy. For example, a first subsurface anatomy representation model 48 can be trained to generate a skin tension map that maps skin tension across the user's face, while a second subsurface anatomy representation model 48 can be trained to generate a blood flow map that maps blood flow under the skin of the user's face.

The model repository 40 can include model information 50. The model information 50 can store and track various characteristics of the various machine-learned models 44-48 stored in the model repository 40. In particular, the model information 50 can include a timestamp for the last time a model was updated or trained, a version number, an identifier, local processing capabilities, estimated compute usage (e.g., X number of FLOPS to utilize for inference), processing latency (e.g., 15 seconds to generate a mesh representation), etc.

To follow the depicted example, the model information 50 can indicate that the machine-learned mesh representation model 44 has an identifier of "0932," a model type of "MESH_GEN," a version number of "0.9" and a "LOC" value of "N." The "LOC" value can indicate whether the model, or a lightweight version of the model, can be instantiated and executed locally at the computing device 20 to reduce compute utilization at the computing system 10. Utilizing distributed computing techniques to generate the photorealistic 3D mesh representation of the face of the user will be discussed in greater detail further in the specification.

It should be noted that the model repository 40 can include any other type or manner of generative model that can generate an output suitable for use in generating a photorealistic 3D representation of a user's face. For example, although not depicted, the model repository 40 may include a machine-learned model specifically trained to generate implicit representations of a user's hair. For another example, although not depicted, the model repository 40 may include a machine-learned model specifically trained to upscale existing model outputs (e.g., processing a mesh representation to increase the number of polygons included in the mesh representation). For yet another example, although not depicted, the model repository 40 may include a model trained to modify the mesh representation to represent additional surface imperfections of sufficient depth or size (e.g., moles, pores, etc.) in greater detail.

The machine-learned model handler 38 can utilize the model trainer 42 to train the machine-learned models 44-48. The model trainer 42 can include an iterative optimizer 52. The iterative optimizer 52 can train, or otherwise optimize, the machine-learned models 44-48 when the video data 28 is received from the computing device 20 over time. For example, assume that the user of the computing device 20 changes their hair color, and that the video data 28 is the first video data received by the computing system 10 that depicts the user with their new hair color. In response, the iterative optimizer 52 can train, or otherwise optimize, some or all of the machine-learned models 44-48 to reflect the change in hair color for the user. For example, as a result of optimization via the iterative optimizer 52, the machine-learned texture representation model 46 may generate textures that represent the current color of the hair of the user.

Additionally, or alternatively, in some implementations, the iterative optimizer 52 can directly optimize model outputs from the machine-learned models 44-48. To follow the previous example, rather than training the machine-learned texture representation model 46, the iterative optimizer 52 can instead directly modify existing textures for the hair color of the user to modify the color representation of the user's hair.

The model trainer 42 can include a federated learning module 54. The federated learning module 54 can implement federated learning techniques to more efficiently optimize the machine-learned models 44-48. For example, assume that the video data 28 is utilized by the model trainer 42 to calculate an update to values of parameters of the machine-learned mesh representation model 44. If the update is applicable in other contexts, the model trainer 42 can provide information indicative of the update to computing devices other than the computing device 20. In this manner, updates to machine-learned models can be calculated and provided to a distributed network of computing devices in a federated manner.

The model trainer 42 can include loss functions 56. The loss functions 56 can include a loss function utilized to train each of the models included in the model repository 40 in a supervised manner. More specifically, the loss functions 56 can evaluate differences between the outputs of the models 44-48 and corresponding ground-truth outputs. For example, the machine-learned mesh representation model 44 can process the video data 28 to generate a mesh representation of the particular user. One of the loss functions 56 can evaluate a difference between the mesh representation and a ground-truth mesh representation generated using high-fidelity scans of the user's face (e.g., captured using LIDAR sensors, ultrawideband, etc.). In some implementations, the loss functions 56 can include a loss function configured to train each of the machine-learned models 44-48 in an end-to-end fashion (e.g., training all of the models concurrently). The loss functions 56 can include various evaluation criteria selected to efficiently optimize the models included in the model repository 40.

The facial representation module 16 can include a model output repository 58. The model output repository 58 can store outputs generated using the machine-learned models stored to the model repository 40. Specifically, the model output repository 58 can include a mesh output 60 that includes a 3D polygonal mesh representation of the user's face. The model output repository 58 can include a texture output 62 that includes a plurality of textures. The plurality of textures can collectively represent the surface of the user's face. The model output repository 58 can include subsurface anatomy representation model outputs 64-1-64-N (generally, subsurface anatomy representation model outputs 64). The subsurface anatomy representation model output(s) 64 can include outputs that each represent a different subsurface anatomy of the user's face.

The model output repository 58 can include model output information 67. Similar to the model information 50, the model output information 67 can store information descriptive of various characteristics of the model outputs 60-64. To follow the depicted example, the model output information 67 can indicate that the mesh output 60 is a "MESH" type output, is located at an internal address starting with "1.192," is an output of a model with the model identifier "0932," and has a version number of 1.5.

The facial representation module 16 can include a representation animator 66. The representation animator 66 can generate an animation for the photorealistic 3D representation of the user's face generated using the model outputs 60-64. The representation animator 66 can be utilized in conjunction with motion capture information 68.

Motion capture information 68 can be transmitted by the computing device 20 to the computing system 10 in lieu of the video data 28. More specifically, the computing device 20 can, in some instances, determine that the network connection 35 is insufficient for transmitting the video data 28, and in response, generate and transmit the motion capture information 68 to the computing system 10 so that the photorealistic 3D representation of the user's face can be animated and rendered as a substitute for the video data 28.

For example, assume that the computing device 20 is a smartphone device connected to the network 36 via the network connection 35. Further assume that the computing device 20 enters a tunnel, and thus the performance of the network connection 35 is substantially reduced. The memory 24 computing device 20 can include a network performance analyzer 70. The network performance analyzer 70 can generate a network performance metric 72 for the network connection 35. The network performance metric 72 can indicate a current degree of performance for the network connection 35.

The network performance analyzer 70 can further make a determination that the network performance metric 72 is less than a threshold network performance metric. For example, assume that the threshold network performance metric is indicative of a 5 Mbps bandwidth speed. If the network performance metric 72 is indicative of a 3 Mbps bandwidth speed for the network connection 35, the network performance analyzer 70 can make the determination that the network performance metric 72 is less than the threshold network performance metric.

The computing device 20 can include a facial representation module 74. The facial representation module 74 can coordinate with the facial representation module 16 of the computing system 10 to enable the computing system 10 to generate the photorealistic 3D representation of the user's face. In particular, the facial representation module 74 can perform some, or all, of the functionality performed by the facial representation module 16 of the computing system 10.

More generally, the facial representation module 74 of the computing device 20 can perform some (or all) of the functionality associated with the facial representation module 16 of the computing system 10. In some implementations, both the facial representation module 16 and the facial representation module 16 can generate a photorealistic 3D representation of the user's face, or at least some of the representation. In other words, as rendering of the photorealistic 3D facial representation utilizes a plurality of rendering components, the facial representation module 74 of the computing device 20 can generate and transmit a subset of those rendering components to the computing system 10. For example, the facial representation module 74 can obtain the motion capture information 68 and generate, or recognize, a facial motion previously performed by the user. The facial representation module 74 can generate an animation and provide the animation to the facial representation module 16. Alternatively, the facial representation module 74 can recognize the facial motion previously performed by the user and can indicate that particular facial motion to the facial representation module 16. In turn, the facial representation module 16 can retrieve an animation previously generated for the particular facial motion. In this manner, the facial representation module 74 can be used to off-load tasks performed by the facial representation module 16, thus reducing bandwidth expenditure and increasing utilization efficiency for computing resources within the network.

The facial representation module 74 can include a motion capture information generator 76. Responsive to determining that the network performance metric 72 is less than the threshold network performance metric, the motion capture information generator 76 can generate the motion capture information 68. More specifically, the network performance analyzer 70 can indicate to the motion capture information generator 76 to generate the motion capture information 68 based on the current network performance metrics 72.

For example, the network performance metrics 72 can indicate that the network connection 35 is insufficient to transmit the video data 28. The network performance analyzer 70 can indicate to the motion capture information generator 76 to generate the motion capture information 68 based on the current network performance metrics 72. In response, the motion capture information generator 76 can process the video data 28 with a machine-learned motion capture model 78 to obtain the motion capture information 68. The motion capture information 68 can describe a facial motion of the user that is depicted in the video data 28.

In some implementations, the motion capture information 68 can specifically indicate the motions of face of the user.

Specifically, the motion capture information 68 can include sufficient detail to indicate the movement of both the user's skin and the sub-surface anatomies of the user's face (e.g., musculature, skin tension, blood flow, etc.). For example, the motion capture information generator 76 can process the video data 28 with the machine-learned motion capture model 78 to obtain information that provides a detailed description of the movements of the face of the user, such as movements associated with a blood flow map, movements associated with particular muscles of the user's face, movements associated with particular facial features, etc. Alternatively, in some implementations, the motion capture information 68 can indicate a recognized motion of the face of the user.

Specifically, in some implementations, the face of the user can perform a facial movement, expression, microexpression, etc. that is unique to the user. As described herein, a "microexpression" can refer to slight movements of the facial features of the user (e.g., slightly upturned lips, the user's eyes narrowing slightly, etc.). It should be noted that microexpressions have traditionally been difficult to replicate, as they are difficult to both perceive and replicate (e.g., due to the small size of the facial movements). However, successful animation of such movements can substantially increase perceived realism. In other words, microexpressions have been found to convey a sense of real-life realism that is otherwise difficult to replicate. As such, proper detection and animation of such microexpressions provides substantial benefits.

The motion capture information generator 76 can include a recognized motion identifier 80. The recognized motion identifier 80 can identify if a facial motion previously performed by the user is being performed again. The recognized motion identifier 80 can do so based on motion recognition information 82. The motion recognition information 82 can describe and identify previously performed facial expressions. For example, assume that the user performs a unique microexpression for the first time. The motion capture information generator 76 can generate the motion capture information 68, which can describe the various facial movements and anatomical movements that make up the unique microexpression.

In response, the motion capture information generator 76 can receive an identifier for that particular microexpression from the facial representation module 16. The motion capture information generator 76 can modify the motion recognition information 82 to add an entry for the unique microexpression of the face of the user. To follow the depicted example, the entry can indicate a microexpression "MICR1" with an identifier of 9948. The entry can further indicate whether an animation has been generated for the particular microexpression.

To enable such exchanges of information between the computing system 10 and the computing device 20, the facial representation module 16 of the computing system 10 can also include the recognized motion identifier 80 and the motion recognition information 82 in the representation animator 66. The facial representation modules 16 and 74 can exchange information to ensure that the state of the motion recognition information 82 maintained by both modules is identical.

In some implementations, the identifier assigned to a particular facial movement can be a hash value for efficient movement identification. To follow the previous example, the facial representation module 16 can process the motion capture information 68 with a hashing technique (e.g., a conventional hash technique, a machine-learned representation model, etc.) that generates a hash value. The hash value can be utilized as the identifier for the facial movement.

Assume that the user performs the microexpression again. The motion capture information generator 76 can generate the motion capture information 68 for the microexpression. The recognized motion identifier 80 can apply the hash technique to the motion capture information 68 to obtain the hash value being used as the identifier for the microexpression. The recognized motion identifier 80 can determine that the same hash value is stored in the motion recognition information 82 to identify the microexpression. Thus, in this instance, the recognized motion identifier 80 can simply provide the identifier "9948" to the computing system 10 to identify the microexpression, thus reducing bandwidth expenditure even further.

In some implementations, the facial representation module 74 of the computing system 10 can include a machine-learned model handler 84. The machine-learned model handler 84 of the computing device 20 can perform the same, or substantially similar, tasks as those performed by the machine-learned model handler 38. Additionally, or alternatively, in some implementations, the machine-learned model handler 84 can include different models than those included in the machine-learned model handler 38. For example, the machine-learned model handler 38 can include the machine-learned mesh representation model 44. The machine-learned model handler 84 can include a lightweight instance of the machine-learned mesh representation model 44 (e.g., a model with fewer parameters) that is trained via distillation training by the model trainer 42. For another example, the machine-learned model handler 84 can receive model updates for local models via the federated learning module 54.

Returning to the computing system 10, the facial representation module 16 can receive the motion capture information 68. The facial representation module 16 can utilize the representation animator 66 to generate an animation for the user's face based on the motion capture information 68. The animation can be utilized to animate the photorealistic 3D representation of the user's face generated using the model outputs 60-64. The representation animator 66 can be utilized in conjunction with motion capture information 68.

The facial representation module 16 can include a render module 86. The render module 86 can be utilized to render three-dimensional representations of various entities. In particular, the render module 86 can be utilized to generate a rendering of a photorealistic facial representation performing a particular animation. The render module 86 can include various components and information to enable rendering of photorealistic representations, such as a texture mapper 88 and rendering libraries 90.

In particular, the render module 86 can apply the texture output 62 to the mesh output 60 with the texture mapper 88. The render module 86 can apply the subsurface anatomy outputs 64 to the textured mesh. In conjunction with the representation animator 66, the render module 86 can generate a rendering 92 of a photorealistic representation of the user's face performing an animation indicated by the motion capture information 68.

The computing system 10 can transmit the rendering 92 to the computing device 20. In some implementations, the computing system 10 can transmit the rendering 92 to other computing devices that are communicating with the computing device 20. For example, assume that the computing system 10 hosts a teleconference with the teleconference service module 34 that includes the computing device 20. The computing system 10 can transmit the rendering 92 to each computing device connected to the teleconference session. In such fashion, the computing system can enable photorealistic representation of a user's face for telecommunication purposes, thus substantially reducing bandwidth utilization while preserving the immersion provided by video-based communications.

Some implementations of the present disclosure are described in the context of insufficient network conditions that cause a user to switch from streaming video data to an animated photorealistic representation. However, implementations of the present disclosure can be utilized in a wide variety of use-cases.

As one example use-case, implementations described herein can be utilized to participate in virtual worlds, such as video games or other virtual "meta" universes in which representations of users can interact. For example, the network connection 35 for the computing device may be a high-speed connection that rarely, if ever, exhibits poor network performance. Regardless, the computing system 10 can process the video data 28 received from the computing device 20 over time to iteratively optimize the model outputs 60-64 for eventual photorealistic representation of the user's face. In this manner, if the user wishes to participate in a virtual world, the user can utilize their pre-optimized photorealistic representation. Pre-generating the model outputs provides the added benefit of having such representations on-hand in case the user's conditions change (e.g., the user goes on vacation, the user moves to a different location, etc.).

As another example use-case, a user may wish to obfuscate some details of their person or the background of their video stream. In these instances, the user may manually indicate a desire to switch to the photorealistic 3D representation of the user, rather than a video feed. For example, a user may have a temporary skin condition that they are sensitive to. The user can manually select the photorealistic 3D representation of the user for display to other users for telecommunications. In this manner, the user can participate in a teleconference and preserve immersion while avoiding being forced to reveal a sensitive condition to others.

In some implementations, the photorealistic 3D representation of the user can be adjusted based on user-controlled settings and preferences. To follow the previous example, the user may indicate a preference that physical imperfections, blemishes, etc. not be included in the photorealistic 3D representation of the user. Additionally, or alternatively, in some implementations, the user may manually adjust certain characteristics of the photorealistic 3D representation of the user. For example, the user can indicate a preference that the photorealistic 3D representation of the user exhibits a hair color different than the user's own.

It should be noted that, although the implementations described herein are discussed primarily within the context of animating facial motion, implementations of the present disclosure can also be applied to non-facial movements as well. In particular, the photorealistic three-dimensional representation of the user's face can also include a photorealistic three-dimensional representation of the user's body, and the motion capture information can animate some, or all, of the representation of the user's body. For example, in some implementations, motion capture information can indicate micro-movements (e.g., a slight shrug of the user's shoulders, etc.) of the user that indicate some manner of communicative intent. For another example, in some implementations, the motion capture information can indicate movement of the user's fingers (e.g., for conveying sign language, etc.). For yet another example, in some implementations, the motion capture information can indicate movement of the user's entire body.

Figure 2:
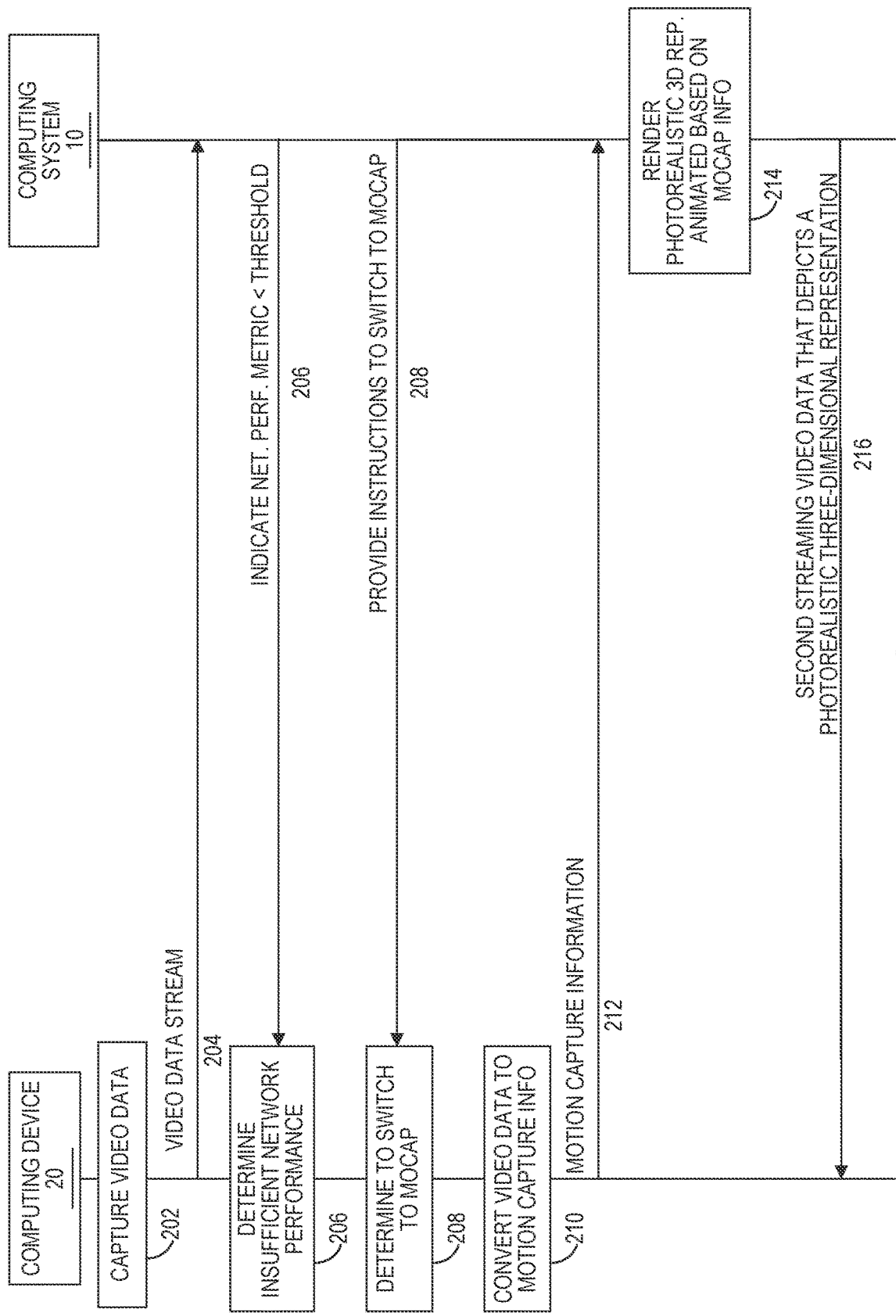
FIG. 2 is a communication flow diagram for dynamically switching between video data and motion capture information based on network performance metrics according to some implementations of the present disclosure.

FIG. 2 is a communication flow diagram for dynamically switching between video data and motion capture information based on network performance metrics according to some implementations of the present disclosure. FIG. 2 will be discussed in conjunction with FIG. 1.

At 202, the computing device can capture the video data 28. At 204, the computing device can transmit streaming video data to the computing system 10. It should be noted that operations 202 and 204 can occur at the same time, or at relatively close times, based on processing speeds of the computing device 20. In other words, the computing device can receive a stream of the video data 28 at 202, and at 204, and can process the stream of the video data 28 (e.g., apply an encoding scheme, etc.) and transmit the stream of the video data 28 to the computing system 10 in real-time.

At 206, insufficient network performance can be determined. More specifically, the computing device 20 can determine that the network connection 35 possesses insufficient performance to effectively carry the video data 28 from the computing device 20 to the computing system 10. In some implementations, the computing device 20 can utilize the network performance analyzer 70 to generate network performance metric 72. The network performance analyzer 70 can determine that the network performance metric 72 is less than a threshold metric. Alternatively, in some implementations, at 206, the computing system 10 can indicate to the computing device 20 that network performance is insufficient. For example, the computing system 10 can indicate to the computing device 20 that the network performance metric 72 is less than a threshold network performance metric.

At 208, the computing device 20 can determine to switch from transmitting the video data 28 to transmitting the motion capture information 68. In some implementations, the computing device 20 can determine to switch based on determining that network performance is insufficient for transmission of the video data 28. Alternatively, in some implementations, the computing device 20 can determine to switch based on instructions received from the computing system 10. In other words, the computing system 10 can provide, or enable provision of, instructions to switch from one mode of communication to another to the computing device 20.

At 210, the computing device 20 can utilize the motion capture information generator 76 to generate the motion capture information 68. For example, the motion capture information generator 76 can process the video data 28 with the machine-learned motion capture model 78 to obtain the motion capture information.

At 212, the computing device 20 can transmit the motion capture information 68 to the computing system 10. For example, the computing device 20 can transmit the motion capture information 68 to the computing system 10 via the network connection 35 to the network 36.

At 214, the computing system 10 generates a rendering 92 of a photorealistic 3D representation of the user's face that is animated based on the motion capture information 212.

At 216, the computing system transmits the rendering 92 of the photorealistic 3D representation of the user's face to the computing system 10.

Figure 3:
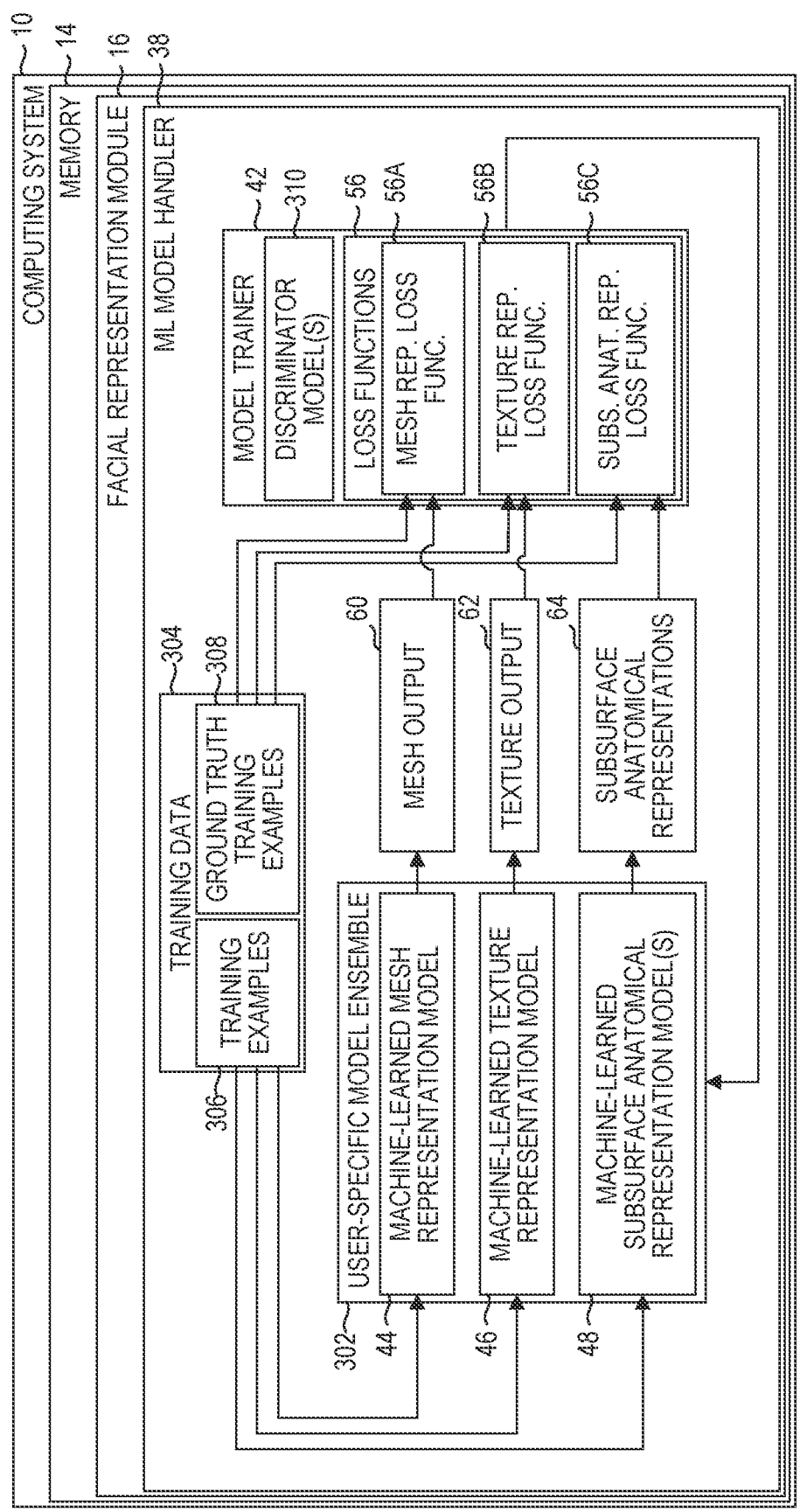
FIG. 3 is a data flow diagram for training a user-specific model ensemble for photorealistic facial representation according to some implementations of the present disclosure.

FIG. 3 is a data flow diagram for training a user-specific model ensemble for photorealistic facial representation according to some implementations of the present disclosure. FIG. 3 will be discussed in conjunction with FIG. 1. More specifically, a user-specific model ensemble 302 can be stored by the machine-learned model handler 38 of the computing system 10. For example, the model repository 40 of the machine-learned model handler 38 can store and manage the user-specific model ensemble 302. The user-specific model ensemble 302 can be a grouping of models that are personalized for a particular user. The user-specific model ensemble 302 can include any type or manner of model utilized to generate model outputs that are included in, or otherwise associated with, a photorealistic representation of the particular user. For example, the user-specific model ensemble 302 can include the machine-learned mesh representation model 44, the machine-learned texture representation model 46, and the subsurface anatomical representation models 48.

As described previously, each model included in the user-specific model ensemble 302 can be personalized for a particular user. As described herein, model "personalization" can refer to training a model, at least partially, on data associated with a particular user. For example, the machine-learned mesh representation model 44 can be trained on images of the particular user or video data that depicts the particular user to personalize the model for the particular user. In some implementations, the models of the user-specific model ensemble 302 undergo non-personalized training iterations prior to personalization.

For example, assume that the machine-learned texture representation model 46 is a large foundational model that is generally trained to perform multiple generative vision tasks (e.g., texture generation, etc.). The machine-learned texture representation model 46 may first undergo training with extremely large corpora of training data to sufficiently train the model to perform multiple generative tasks. The model may then undergo personalization (i.e., "fine-tuning," additional training iterations, etc.) to more accurately represent the particular user. In other words, at least some of the training performed for the models of the user-specific model ensemble 302 can be non-specific to a particular user.

It should be noted that, the user-specific model ensemble 302 is only illustrated as including multiple purpose-specific models to more easily describe various implementations of the present disclosure. However, implementations described herein are not limited to such purpose-specific models. For example, rather than including both the machine-learned mesh representation model 44 and the machine-learned texture representation model 46, the user-specific model ensemble 302 may instead include a model trained to generate a pre-textured mesh representation based on the video data. For another example, the user-specific model ensemble 302 may include a model that is trained to generate a non-mesh representation of the user, such as an implicit representation (e.g., neural radiance fields, etc.), or similar.

The models included in the user-specific model ensemble 302 can be trained based on training data 304. The training data 304 can include training examples 306 and ground truth training examples 306. The training examples 306 can include training examples for each type of model included in the user-specific model ensemble 302. For example, the training examples 306 can include images of the user that have been extracted from the video data 28 provided by the user (e.g., particular key frames, etc.) to train the models.

In some implementations, the ground truth training examples 308 can include a "ground truth" representation of the user generated without use of the machine-learned models of the user-specific model ensemble 302. For example, prior to training, the user can be captured using motion capture technology (e.g., Inertial Measurement Units (IMUs), multiple high-definition cameras, etc.) to construct a highly accurate mesh representation of the user's face. The machine-learned mesh representation model 44 can be trained by the model trainer 42 based on the loss function 56A. The loss function 56A can evaluate the difference between the mesh output 60 and the ground truth training example 308.

Additionally, or alternatively, in some implementations, the model trainer can include discriminator model(s) 310. The discriminator model(s) 310 can be utilized to enable Generative Adversarial Networks (GANs). For example, the ground truth training examples can include photorealistic textures for user faces created by artists. The discriminator model(s) 310 can include a model trained to discriminate between "real" artist-created photorealistic textures and "fake" texture outputs, such as the texture output 62. The machine-learned texture representation model 46 can generate the texture output 62, and the discriminator model(s) 310 can evaluate whether one of the ground-truth training examples 308 or the texture output 62 is the "real" texture output. The machine-learned texture representation model 46 can be trained by the model trainer 42 based on the output of the discriminator model(s) 310. In this manner, the machine-learned texture representation model can be trained to generate an increasingly realistic texture output 62.

Figure 4:
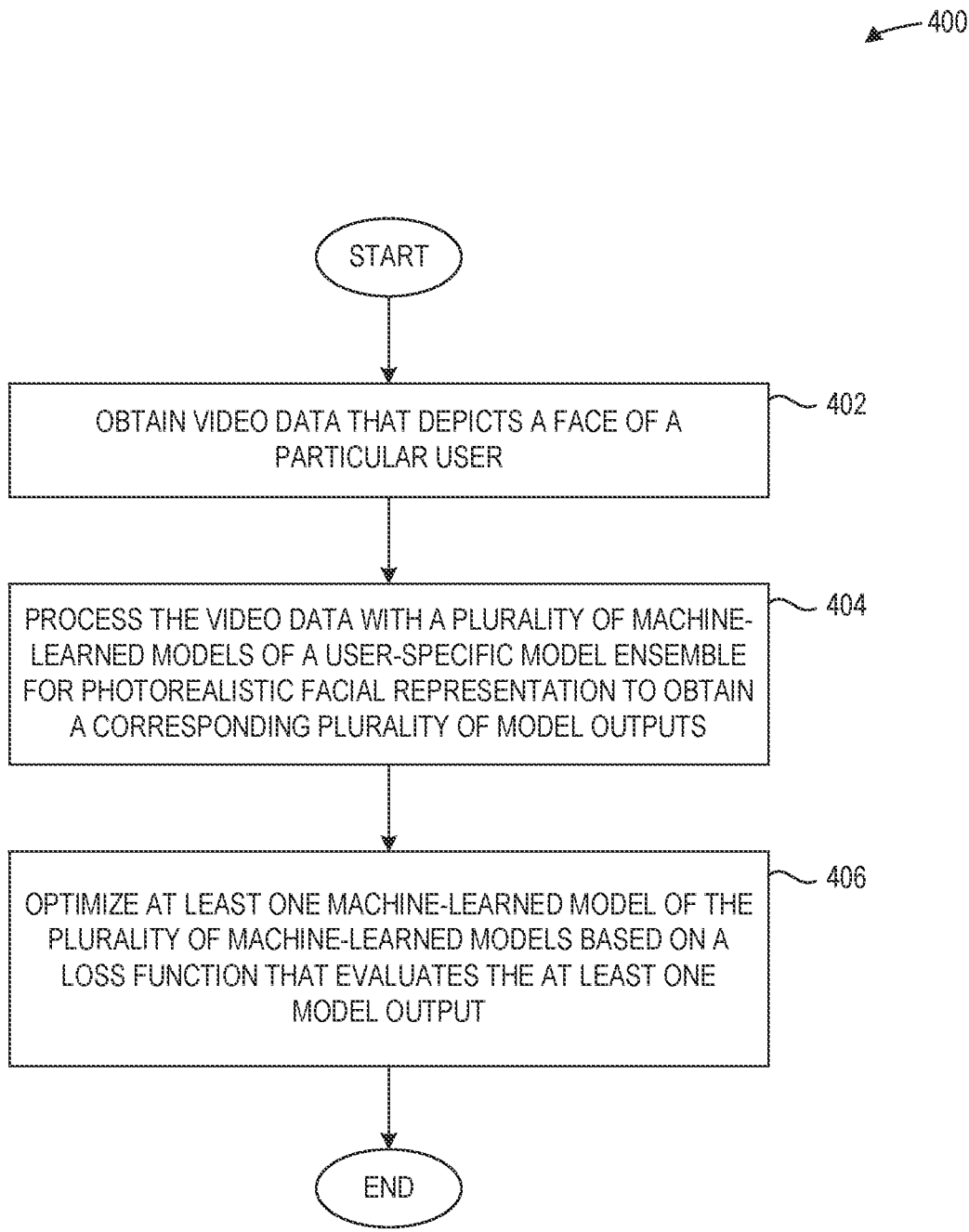
FIG. 4 depicts a flow chart diagram of an example method to optimize model outputs and/or machine-learned models for photorealistic representation of a user's face according to some implementations of the present disclosure.

FIG. 4 depicts a flow chart diagram of an example method 400 to optimize model outputs and/or machine-learned models for photorealistic representation of a user's face according to some implementations of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can obtain video data that depicts a face of a particular user. For example, the computing system may obtain video data from a user computing device (e.g., a smartphone, laptop, etc.) that depicts the face of a user associated with the user computing device.

At 404, the computing system can process the video data with a plurality of machine-learned models of a user-specific model ensemble for photorealistic facial representation. By processing the video data, the computing system can obtain a corresponding plurality of model outputs from the user-specific model ensemble. The user-specific model ensemble can include a number of machine-learned models. For example, the user-specific model ensemble can include a machine-learned mesh representation model trained to generate a 3D polygonal mesh representation of the face of the particular user. For another example, the user-specific model ensemble can include a machine-learned texture representation model trained to generate a plurality of textures representative of the face of the particular user. For yet another example, the user-specific model ensemble can include one or more subsurface anatomical representation models trained to generate one or more respective sub-surface model outputs. Each sub-surface model output can be a representation of a different sub-surface anatomy of the face of the particular user.

In some implementations, processing the video data with the plurality of machine-learned models of the user-specific model ensemble for photorealistic facial representation to obtain the corresponding plurality of model outputs can include processing the video data with a blood-flow mapping model of the one or more subsurface anatomical representation models to obtain a sub-surface model output indicative of a mapping of a blood flow anatomy of the face of the particular user.

Additionally, or alternatively, in some implementations, processing the video data with the plurality of machine-learned models of the user-specific model ensemble for photorealistic facial representation to obtain the corresponding plurality of model outputs can include processing the video data with a skin tension mapping model of the one or more subsurface anatomical representation models to obtain a sub-surface model output indicative of a mapping of a skin tension anatomy of the face of the particular user.

At 406, the computing system can optimize at least one machine-learned model of the plurality of machine-learned models based on a loss function that evaluates the at least one model output. In some implementations, the computing system can generate at least one optimized model output with the at least one machine-learned model. Additionally, or alternatively, in some implementations, the computing system can optimize an existing model output based on machine learning techniques or non-machine-learning techniques. For example, the video data can indicate that the user has changed their hair color. In response, the computing system may simply change a parameter corresponding to the color of the user's hair within the texture output of the machine-learned texture representation model, rather than performing training iterations using the video data.

In some implementations, the computing system can update a user-specific model output repository for photorealistic facial representation based on the at least one optimized model output. The user-specific model output repository can store an optimized instance of each of the plurality of model outputs. To follow the previous example, in response to the user's hair color changing, the computing system can simply change the parameter corresponding to the color of the user's hair within an optimized model output stored to the model repository.

In some implementations, the computing system can receive information descriptive of second video data from the computing device associated with the particular user. The second video data can depict the face of the particular user performing a microexpression that is unique to the particular user. The second video data can be captured for display to a teleconference session that includes the computing device and one or more second computing devices. The computing system can use the plurality of model outputs to render a photorealistic animation of the face of the particular user performing the microexpression unique to the particular user depicted by the second video data.

In some implementations, the computing system can transmit the photorealistic animation of the face of the particular user performing the microexpression to the one or more second computing devices of the teleconference session.

In some implementations, to receive the information descriptive of the second video data from the computing device, the computing system can receive, from the computing device associated with the particular user, the information descriptive of the second video data. The information descriptive of the second video data can include a plurality of key frames from the second video data. Additionally, or alternatively, in some implementations, the information descriptive of the second video data can include motion capture information derived from the second video data.

In some implementations, the computing system can generate model update information descriptive of optimizations made to the at least one machine-learned model. The computing system can transmit the model update information to a computing device associated with the particular user.

Figure 5:
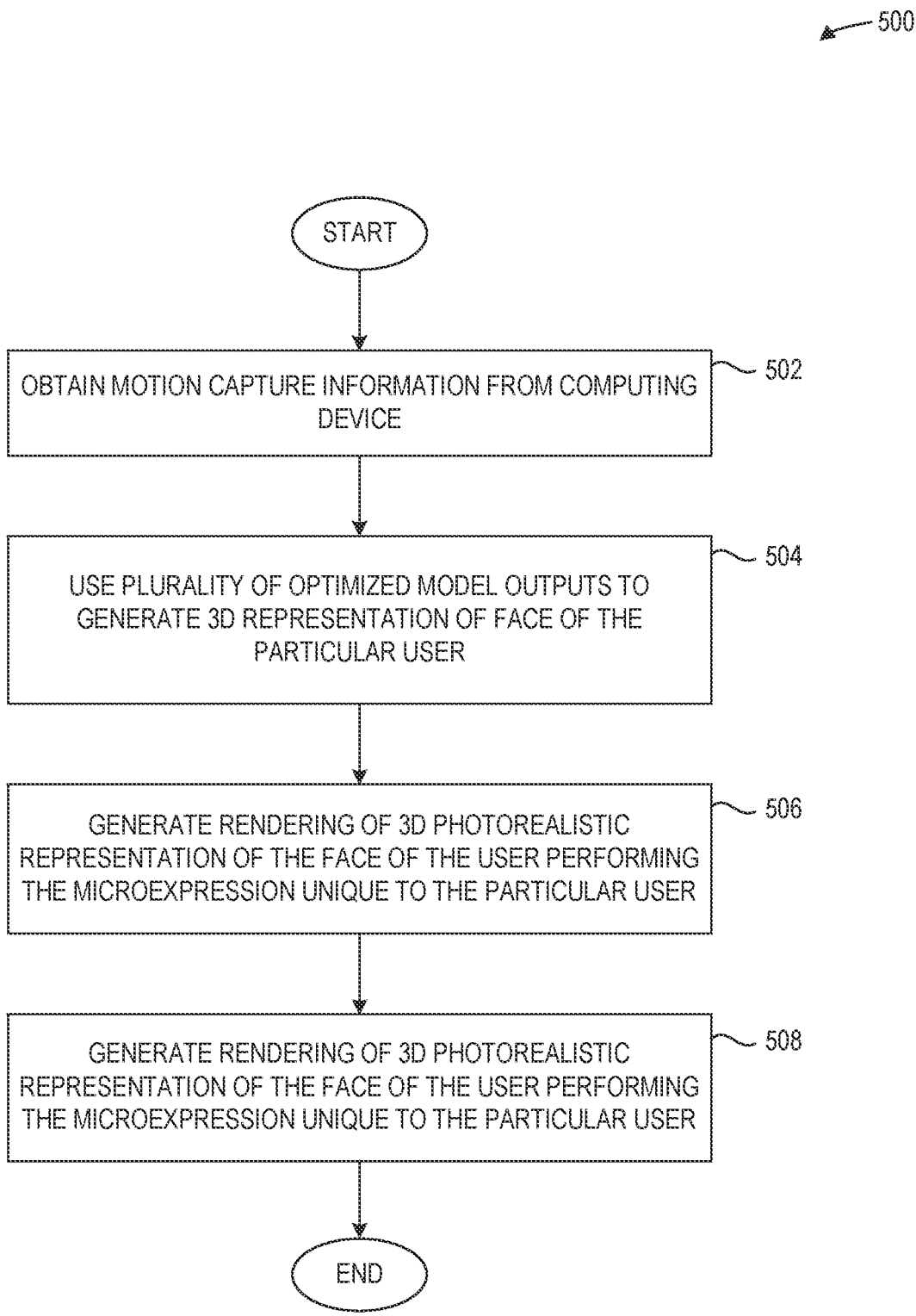
FIG. 5 depicts a flow chart diagram of an example method to generate a photorealistic representation of a user's face according to some implementations of the present disclosure.

FIG. 5 depicts a flow chart diagram of an example method 500 to generate a photorealistic representation of a user's face according to some implementations of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain motion capture information from a computing device associated with a particular user. The motion capture information can be indicative of a face of the particular user performing a microexpression unique to the particular user.

At 504, the computing system can use a plurality of optimized model outputs to generate a 3D photorealistic representation of the face of the particular user. The plurality of optimized model outputs can be obtained from a corresponding plurality of machine-learned models of a user-specific model ensemble for photorealistic facial representation.

In some implementations, to use the plurality of optimized model outputs, the computing system can obtain a model output comprising the 3D polygonal mesh representation of the face of the particular user. The computing system can apply a model output comprising the plurality of textures representative of the face of the particular user to the 3D polygonal mesh representation of the face of the particular user. Additionally, or alternatively, in some implementations, the computing system can apply one or more sub-surface model outputs to the 3D polygonal mesh representation of the face of the particular user, wherein each of the one or more sub-surface model outputs represents a different sub-surface anatomy of the face of the particular user.

At 506, the computing system can, based on the motion capture information, generate a rendering of the 3D photorealistic representation of the face of the particular user performing the microexpression unique to the particular user.

In some implementations, to generate the rendering, the computing system can obtain a microexpression animation for the microexpression unique to the particular user. The computing system can animate the 3D polygonal mesh representation of the face of the particular user based on the microexpression animation. In some implementations, to obtain the microexpression animation, the computing system can process the motion capture information with an animator model of the plurality of machine-learned models of the user-specific model ensemble for photorealistic facial representation to obtain a model output that includes the microexpression animation. Additionally, or alternatively, in some implementations, the computing system can retrieve the microexpression animation from a user-specific model output repository that stores an optimized instance of each of the plurality of model outputs.

At 508, the computing system can transmit the rendering of the 3D photorealistic representation of the face of the particular user to one or more second computing devices of a teleconference session that includes the computing device and the one or more second computing devices.

Figure 6:
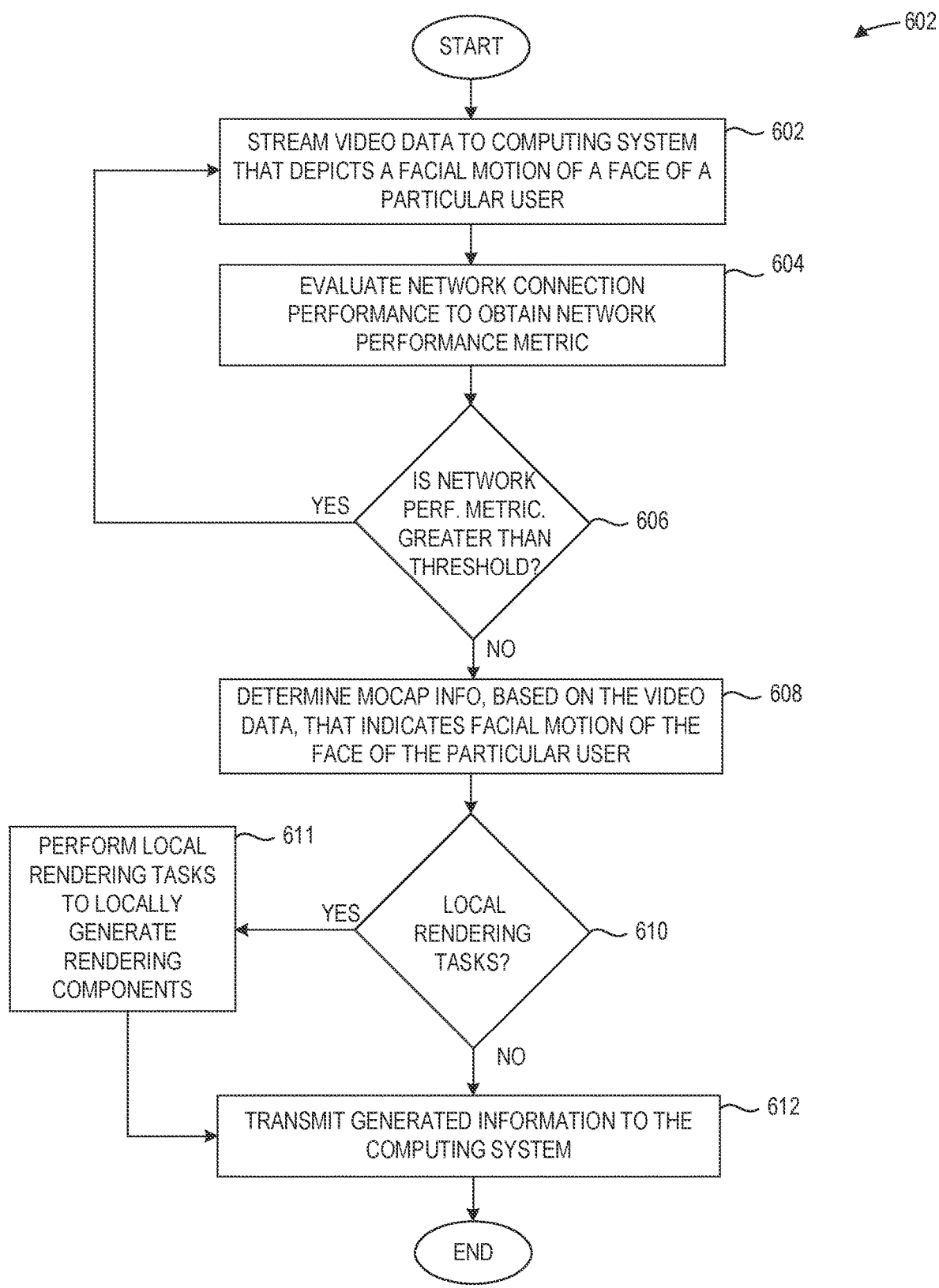
FIG. 6 depicts a flow chart diagram of an example method to dynamically switch between video data streaming and photorealistic facial representation based on network performance according to some implementations of the present disclosure.

FIG. 6 depicts a flow chart diagram of an example method 600 to dynamically switch between video data streaming and photorealistic facial representation based on network performance according to some implementations of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 602, a computing device (e.g., a user computing device such as a smartphone, etc.) can obtain video data that depicts a facial motion of a face of a particular user of the computing device. In some implementations, the video data can be obtained for transmission to a computing system via a network connection. In some implementations, the computing device can capture the video data that depicts the facial motion of the face of the particular user via a video capture device associated with the computing device. The video data can be obtained for transmission to a teleconference session orchestrated by the computing system via the network connection.

At 604, the computing device can evaluate network connection performance for a network connection of the computing device to obtain a network performance metric. The network performance metric can describe, or otherwise indicate, a current degree of performance for the network connection. In some implementations, to evaluate the network connection, the computing device can measure the network connection to obtain the network performance metric for the network connection. The network performance metric can be indicative of a degree of packet loss associated with the network connection, a latency associated with the network connection, a video resolution associated with the video data, a bandwidth associated with the network connection, one or more restrictions associated with transmission via the network connection, etc.

At 606, the computing device can make a determination whether the network performance metric for the network connection is less than a threshold network performance metric. If the network performance metric for the network connection is greater than or equal to the threshold network performance metric, the computing system can return to 602 and obtain the video data that depicts the facial motion of the face of the particular user of the computing device for transmission to the computing system via the network connection. Alternatively, if the network performance metric for the network connection is less than the threshold network performance metric, the computing system can proceed to 608.

In some implementations, to make the determination whether the network performance metric for the network connection is less than a threshold network performance metric, the computing system can receive information indicating that the network performance metric for the network connection is less than the threshold network performance metric from the computing system.

At 608, the computing device can determine motion capture information based on the video data. The motion capture information can be indicative of the facial motion of the face of the particular user. In some implementations, the computing device can determine the motion capture information by processing the video data with a machine-learned motion capture model to obtain the motion capture information. The machine-learned motion capture model can be trained to predict motion capture information from the video data.

At 610, the computing device can determine whether local rendering tasks can be performed at the computing device. If the computing device determines that local rendering tasks cannot be performed at the computing device, the computing device can proceed to 612. Alternatively, if the computing device determines that local rendering tasks can be performed at the computing device, the computing device can proceed to 611.

At 611, the computing device can perform local rendering tasks to locally generate rendering components. Rendering components can generally refer to model outputs, or other components, that collectively form or are utilized to form the photorealistic representation of the user's face. For example, the computing device may generate or modify a mesh representation of the user's face locally. For another example, the computing device may generate or modify a texture representation of the user's face locally. For yet another example, the computing device may generate or modify a subsurface anatomical representation locally.

At 612, the computing device can transmit the motion capture information to the computing system. The motion capture information can be transmitted for utilization in animating the photorealistic three-dimensional representation of the face of the particular user to perform the motion made by the face of the particular user. In some implementations, if the computing device performed local rendering tasks to locally generate rendering components, the computing device can also provide the rendering components to the computing system alongside the motion capture information.

In some implementations, the computing device can receive second streaming video data from the computing system. The second video data can depict a photorealistic three-dimensional representation of the face of the particular user. The photorealistic three-dimensional representation of the face of the particular user can be animated to perform the facial motion. In some implementations, the photorealistic three-dimensional representation of the face of the particular user can include a plurality of rendering components. In some implementations, the rendering components can include a three-dimensional polygonal mesh representation of the face of the particular user, a plurality of textures representative of the face of the particular user, and/or one or more sub-surface model outputs, each including a representation of a different sub-surface anatomy of the face of the particular user.

In some implementations, responsive to transmitting the motion capture information, and/or the rendering components, the computing device can receive a model update for the machine-learned motion capture model. The model update can be determined by the computing system based at least in part on the motion capture information.

Figure 7:
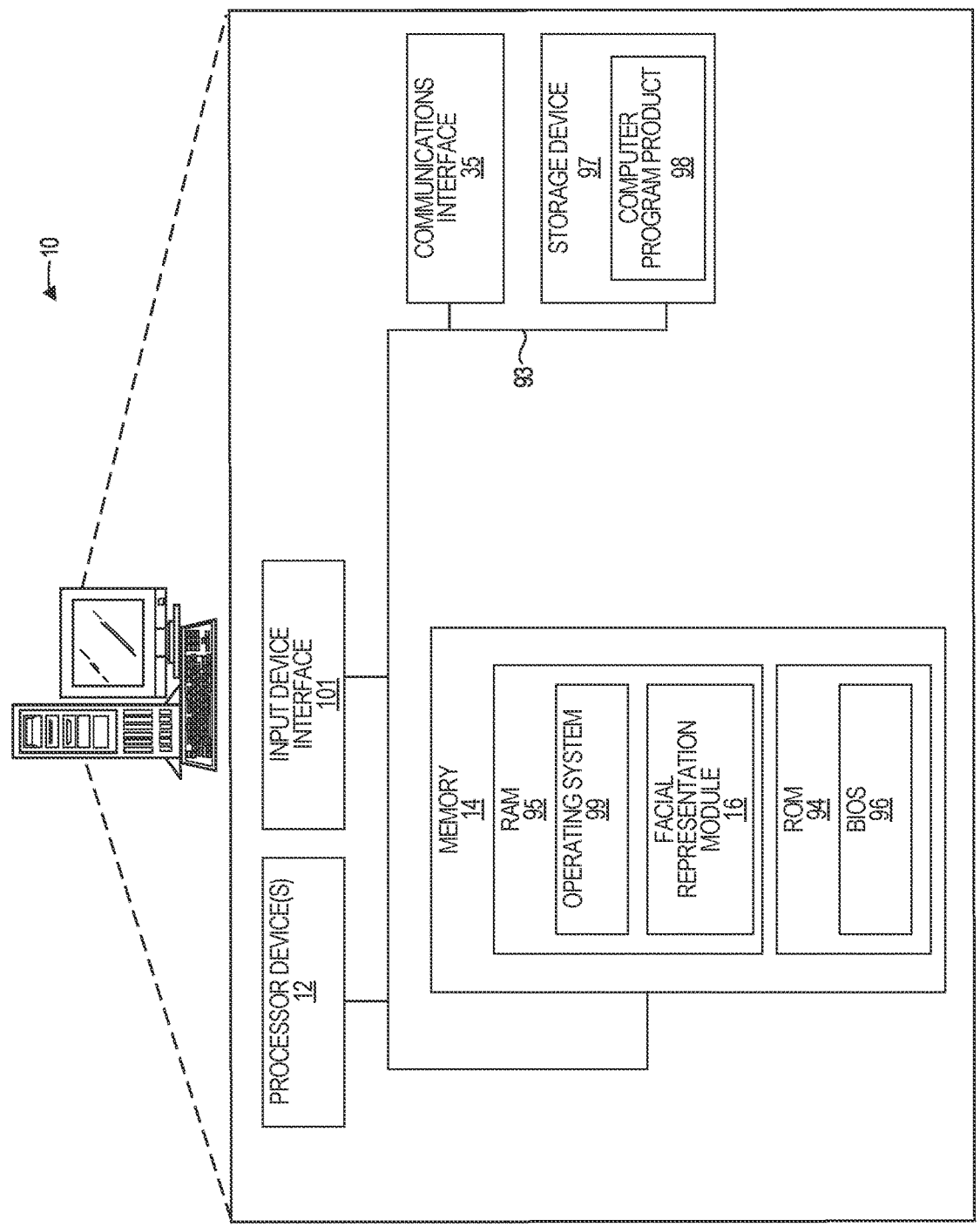
FIG. 7 is a block diagram of the computing system suitable for implementing examples according to one example.

FIG. 7 is a block diagram of the computing system 10 suitable for implementing examples according to one example. The computing system 10 may comprise any computing or electronic device capable of including firmware, hardware, and/or executing software instructions to implement the functionality described herein, such as a computer server, a desktop computing device, a laptop computing device, a smartphone, a computing tablet, or the like. The computing system 10 includes the processor device(s) 12, the memory 14, and a system bus 93. The system bus 93 provides an interface for system components including, but not limited to, the memory 14 and the processor device(s) 12. The processor device(s) 12 can be any commercially available or proprietary processor.

The system bus 93 may be any of several types of bus structures that may further interconnect to a memory bus (with or without a memory controller), a peripheral bus, and/or a local bus using any of a variety of commercially available bus architectures. The memory 14 may include non-volatile memory 94 (e.g., read-only memory (ROM), erasable programmable read-only memory (EPROM), electrically erasable programmable read-only memory (EEPROM), etc.), and volatile memory 95 (e.g., random-access memory (RAM)). A basic input/output system (BIOS) 96 may be stored in the non-volatile memory 94 and can include the basic routines that help to transfer information between elements within the computing system 10. The volatile memory 95 may also include a high-speed RAM, such as static RAM, for caching data.

The computing system 10 may further include or be coupled to a non-transitory computer-readable storage medium such as the storage device 97, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 97 and other drives associated with computer-readable media and computer-usable media may provide non-volatile storage of data, data structures, computer-executable instructions, and the like.

A number of modules can be stored in the storage device 97 and in the volatile memory 95, including an operating system 99 and one or more program modules, such as the facial representation module 16, which may implement the functionality described herein in whole or in part. All or a portion of the examples may be implemented as a computer program product 98 stored on a transitory or non-transitory computer-usable or computer-readable storage medium, such as the storage device 97, which includes complex programming instructions, such as complex computer-readable program code, to cause the processor device(s) 12 to carry out the steps described herein. Thus, the computer-readable program code can comprise software instructions for implementing the functionality of the examples described herein when executed on the processor device(s) 12. The processor device(s) 12, in conjunction with the facial representation module 16 in the volatile memory 95, may serve as a controller, or control system, for the computing system 10 that is to implement the functionality described herein.

Because the facial representation module 16 is a component of the computing system 10, functionality implemented by the facial representation module 16 may be attributed to the computing system 10 generally. Moreover, in examples where the facial representation module 16 comprises software instructions that program the processor device(s) 12 to carry out functionality discussed herein, functionality implemented by the facial representation module 16 may be attributed herein to the processor device(s) 12.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 12 through an input device interface 101 that is coupled to the system bus 93 but can be connected by other interfaces such as a parallel port, an Institute of Electrical and Electronic Engineers (IEEE) 1394 serial port, a Universal Serial Bus (USB) port, an IR interface, and the like. The computing system 10 may also include the communications interface/network connection 35 (e.g., network connection or interface that enables a network connection) suitable for communicating with the network(s) 36 as appropriate or desired. The computing system 10 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:
   obtaining, by a computing device comprising one or more processor devices, video data that depicts a facial motion of a face of a particular user of the computing device;
   making, by the computing device, a determination that a network performance metric for a network connection of the computing device is less than a threshold network performance metric;
   responsive to the determination, determining, by the computing device, motion capture information based on the video data, wherein the motion capture information is indicative of the facial motion of the face of the particular user; and
   transmitting, by the computing device, the motion capture information to the computing system for animation of a photorealistic three-dimensional representation of the face of the particular user.

2. The method of claim 1, wherein the method further comprises:
   receiving, by the computing device from the computing system, second streaming video data that depicts a photorealistic three-dimensional representation of the face of the particular user, and wherein the photorealistic three-dimensional representation of the face of the particular user is animated to perform the facial motion of the face of the particular user.

3. The method of claim 2, wherein the photorealistic three-dimensional representation of the face of the particular user comprises a plurality of rendering components.

4. The method of claim 3, wherein the plurality of rendering components comprises at least one of:
   a three-dimensional polygonal mesh representation of the face of the particular user;
   a plurality of textures representative of the face of the particular user; or
   one or more sub-surface model outputs, each comprising a representation of a different sub-surface anatomy of the face of the particular user.

5. The method of claim 4, wherein transmitting the motion capture information to the computing system comprises:
   transmitting, by the computing device, the motion capture information and a subset of the plurality of rendering components to the computing system.

6. The method of claim 5, wherein transmitting the motion capture information and the subset of the plurality of rendering components to the computing system comprises:
   generating, by the computing device, the subset of the plurality of rendering components.

7. The method of claim 6, wherein generating the subset of rendering components comprises:
   processing, by the computing device, the motion capture information with a subsurface anatomical representation model to obtain a sub-surface model output comprising a representation of a sub-surface anatomy of the face of the particular user.

8. The method of claim 6, wherein generating the subset of rendering components comprises:
processing, by the computing device, the motion capture information with a machine-learned texture representation model to obtain a plurality of textures representative of at least some of the face of the particular user.

9. The method of claim 1, wherein determining the motion capture information based on the video data comprises:
processing, by the computing device, the video data with a machine-learned motion capture model to obtain the motion capture information, wherein the machine-learned motion capture model is trained to predict motion capture information from video data.

10. The method of claim 9, wherein the method further comprises:
receiving, by the computing device from the computing system, a model update for the machine-learned motion capture model, wherein the model update is determined by the computing system based at least in part on the motion capture information.

11. The method of claim 1, wherein obtaining the video data that depicts the facial motion comprises:
capturing, by the computing device, the video data that depicts the facial motion of the face of the particular user via a video capture device associated with the computing device, wherein the video data is captured for transmission to a teleconference session orchestrated by the computing system via the network connection.

12. The method of claim 1, wherein making the determination that the network performance metric for the network connection is less than the threshold network performance metric comprises:
receiving, by the computing device from the computing system, information indicating that the network performance metric for the network connection is less than the threshold network performance metric.

13. The method of claim 1, wherein making the determination that the network performance metric for the network connection is less than the threshold network performance metric comprises:
measuring, by the computing device, the network connection to obtain the network performance metric for the network connection, wherein the network performance metric is indicative of one or more of:
a degree of packet loss associated with the network connection;
a latency associated with the network connection;
a video resolution associated with the video data;
a bandwidth associated with the network connection; or
one or more restrictions associated with transmission via the network connection.

14. A computing system, comprising:
a memory; and
one or more processor devices coupled to the memory configured to:
receive, from a computing device, video data that depicts a face of a particular user associated with the computing device;
determine that the computing device has ceased transmission of video data responsive to a network performance metric associated with a network connection of the computing device;
receive, from the computing device, motion capture information indicative of facial motion of the face of the particular user of the computing device, wherein the motion capture information is derived by the computing device from video data that depicts the facial motion of the face of the particular user; and
generate second video data that depicts a photorealistic three-dimensional representation of the face of the particular user, wherein the photorealistic three-dimensional representation of the face of the particular user is animated to perform the facial motion based on the motion capture information.

15. The computing system of claim 14, wherein the one or more processor devices are further configured to:
transmit the second video data to the computing device; and
wherein receiving the video data that depicts the face of the particular user associated with the computing device comprises:
receiving, from a computing device, the video data that depicts the face of the particular user associated with the computing device, wherein the video data is for broadcast to a teleconference session orchestrated by the computing system, and wherein the teleconference session comprises the computing device and one or more second computing devices; and
wherein the one or more processor devices are further configured to transmit the second video data to the one or more second computing devices.

16. The computing system of claim 14, wherein generating the second video data comprises:
obtaining a plurality of rendering components, the plurality of rendering components comprising:
a three-dimensional polygonal mesh representation of the face of the particular user;
a plurality of textures representative of the face of the particular user; and
one or more sub-surface model outputs, each comprising a representation of a different sub-surface anatomy of the face of the particular user.

17. The computing system of claim 16, wherein generating the second video data further comprises:
applying the plurality of textures to the three-dimensional polygonal mesh representation; and
based on the three-dimensional polygonal mesh representation, rendering the photorealistic three-dimensional representation to obtain the second video data, wherein the second video data comprises a rendering of the three-dimensional polygonal mesh representation animated to perform the facial motion indicated by the motion capture information.

18. The computing system of claim 16, wherein obtaining the plurality of rendering components comprises:
receiving, from the computing device, at least one of the plurality of rendering components.

19. The computing system of claim 14, wherein determining that the computing device has ceased the transmission of the video data responsive to the network performance metric associated with the network connection of the computing device comprises:
measuring the network performance metric associated with the network connection of the computing device;
determining that the network performance metric is less than a threshold network performance metric; and
providing, to the computing device, instructions to switch from provision of video data to provision of motion capture information.

20. A non-transitory computer-readable storage medium that includes executable instructions configured to cause one or more processor devices of a computing device to:

obtain video data that depicts a facial motion of a face of a particular user of the computing device;

make a determination that a network performance metric for a network connection of the computing device is less than a threshold network performance metric;

responsive to the determination, determine motion capture information based on the video data, wherein the motion capture information is indicative of the facial motion of the face of the particular user; and transmit the motion capture information to the computing system for animation of a photorealistic three-dimensional representation of the face of the particular user.

21. A computing device, comprising:

a memory; and one or more processor devices coupled to the memory configured to:

obtain video data that depicts a facial motion of a face of a particular user of the computing device;

make a determination that a network performance metric for a network connection of the computing device is less than a threshold network performance metric;

responsive to the determination, determine motion capture information based on the video data, wherein the motion capture information is indicative of the facial motion of the face of the particular user; and transmit the motion capture information to a computing system for animation of a photorealistic three-dimensional representation of the face of the particular user.

22. A method, comprising:

receiving, by a computing system comprising one or more processor devices from a computing device, video data that depicts a face of a particular user associated with the computing device;

determining, by the computing system, that the computing device has ceased transmission of video data responsive to a network performance metric associated with a network connection of the computing device;

receiving, by the computing system from the computing device, motion capture information indicative of facial motion of the face of the particular user of the computing device, wherein the motion capture information is derived by the computing device from video data that depicts the facial motion of the face of the particular user; and generating, by the computing system, second video data that depicts a photorealistic three-dimensional representation of the face of the particular user, wherein the photorealistic three-dimensional representation of the face of the particular user is animated to perform the facial motion based on the motion capture information.

23. A non-transitory computer-readable storage medium that includes executable instructions configured to cause one or more processor devices of a computing system to:

receive, from a computing device, video data that depicts a face of a particular user associated with the computing device;

determine that the computing device has ceased transmission of video data responsive to a network performance metric associated with a network connection of the computing device;

receive, from the computing device, motion capture information indicative of facial motion of the face of the particular user of the computing device, wherein the motion capture information is derived by the computing device from video data that depicts the facial motion of the face of the particular user; and generate second video data that depicts a photorealistic three-dimensional representation of the face of the particular user, wherein the photorealistic three-dimensional representation of the face of the particular user is animated to perform the facial motion based on the motion capture information.

* * * * *